United States Patent

Watson

[11] Patent Number: 5,975,440
[45] Date of Patent: Nov. 2, 1999

[54] MIXING

[76] Inventor: William Ferguson Watson, 43 Castle Avenue, Hythe, Kent CT2Y 5HD, United Kingdom

[21] Appl. No.: 08/945,239
[22] PCT Filed: Apr. 22, 1996
[86] PCT No.: PCT/GB96/00956
  § 371 Date: Oct. 20, 1997
  § 102(e) Date: Oct. 20, 1997
[87] PCT Pub. No.: WO96/33008
  PCT Pub. Date: Oct. 24, 1996

[30] Foreign Application Priority Data

Apr. 21, 1995 [GB] United Kingdom .................. 9508186
Dec. 29, 1995 [GB] United Kingdom .................. 9526628

[51] Int. Cl.⁶ ................................ B02C 7/02; B02C 7/12
[52] U.S. Cl. ................................ 241/18; 241/23; 241/27; 241/65; 241/261.3; 241/DIG. 14; 241/DIG. 31
[58] Field of Search ............ 241/18, 27, 261.3, 241/261.1, 260.1, DIG. 31, 23, 65, DIG. 14

[56] References Cited

U.S. PATENT DOCUMENTS

| 1,403,681 | 1/1922 | Gordon . |
| 1,869,833 | 8/1932 | Williams . |
| 3,634,381 | 1/1972 | Lehnerer et al. . |
| 4,071,167 | 1/1978 | Kelly . |
| 4,082,234 | 4/1978 | Hoffman ................ 241/248 |
| 4,383,650 | 5/1983 | Contal et al. .............. 241/66 |
| 4,502,643 | 3/1985 | Burggrabe ............. 241/261.3 X |
| 4,678,127 | 7/1987 | Cumpston .............. 241/46.04 |
| 4,917,834 | 4/1990 | Hadermann et al. . |
| 5,244,159 | 9/1993 | Newnan ................. 241/261.3 |
| 5,411,216 | 5/1995 | O'Keefe . |

FOREIGN PATENT DOCUMENTS

| 0111391 | 6/1984 | European Pat. Off. . |
| 9410196 | 8/1994 | Germany . |
| 398306 | 9/1933 | United Kingdom . |
| 842692 | 6/1956 | United Kingdom . |
| 1365090 | 12/1971 | United Kingdom . |
| 1585532 | 7/1977 | United Kingdom . |
| 1569093 | 4/1978 | United Kingdom . |
| 2142554 | 1/1985 | United Kingdom . |
| 2267653 | 12/1993 | United Kingdom . |

*Primary Examiner*—John M. Husar
*Attorney, Agent, or Firm*—Davis and Bujold

[57] ABSTRACT

Batch mixing takes place in the gap (3) between grooved faces of counter-rotating discs (1,2) such that the spiral grooves (8) and lands (10) of each face traverse the grooves (8) and lands (10) of the other, to shear and split material drawn inwardly along the grooves (8) for distributive mixing. Modifications include plural-turn spiral, straight, and truncated spiral grooving (FIGS. 5 to 10), and batch mixing in which only one disc (28) rotates (FIG. 11). Continuous mixing involving shear is carried out within a cylindrical barrel (40 FIG. 12;57 FIG. 13) between its internal helical-grooving (43;590 and the helical grooving (44;60), of opposite hand, of a rotor (41;58). The shearing can produce mechanochemical reactions that break down the molecular structure of the material, notably in the context of mastication and solubilising of used rubber in reclaim from vehicle-tyres.

23 Claims, 5 Drawing Sheets

MIXING

This invention relates to mixing, and in this regard is concerned with mixers and mixing methods.

BACKGROUND OF THE INVENTION

The invention is especially concerned with heavy-duty mixers and heavy-duty mixing methods that are capable of use where, for example, the resultant mix has a viscosity of some 3,000 poise (300 N/m$^2$) or more. Such mixers and mixing methods are applicable, for example, in the mastication and blending of rubbers, in the mixing of rubbers with carbon black and other ingredients for vulcanisation, in incorporating plasticisers and other chemicals into polyvinyl chloride, and in mixing fillers into polyethylene and polystyrene. The known mixers and mixing methods used for such applications have practical shortcomings, and in this regard it is an object of the present invention to provide improved forms of mixer and mixing method.

SUMMARY OF THE INVENTION

According to one aspect of the present invention there is provided a mixer wherein a first member that is mounted for movement relative to a second member has a grooved surface that is opposed to, and separated by a gap from, a grooved surface of the second member such that one or more grooves and lands of each grooved surface are traversed within the gap by one or more grooves and lands of the other surface during said movement of the first member for shearing and splitting material entered into the gap, and the grooves have outwardly-inclined walls, characterised in that the grooves of each member are also configured to draw the entered material progressively further into the gap forcing it along the grooves to well up for mixing distributively with material moving backwardly of the grooves in the gap.

There is also provided, according to another aspect of the invention, a method of mixing wherein material to be mixed is entered into a gap between opposed grooved-surfaces of two members and there is relative movement between the two members such that one or more grooves and lands of each grooved surface are traversed within the gap by one or more grooves and lands of the other surface so as to subject the material within the gap to shearing and splitting, and the grooves have outwardly-inclined walls, characterised in that the grooves of each member are also configured to draw the entered material progressively further into the gap forcing it along the grooves to well up for mixing distributively with material moving backwardly of the grooves in the gap.

The said surfaces of the mixer and the method of mixing of the present invention may be substantially planar faces and the relative movement may be rotational with the grooved faces opposed face to face with one another. Both members, or only one, may rotate, and the grooving of one or both of them may comprise one or more spiral grooves or parts of such grooves. The grooving in this latter regard may comprise a multiplicity of spiral grooves each of less than one turn, or, on the other hand, may comprise a multiplicity of straight grooves radiating from a position off-centre with respect to the axis of relative rotation of the two members. The grooves of the grooving, whether spiral or straight, are preferably of reducing width and depth inwardly of the respective members.

The use of grooved planar faces is convenient where batch mixing is to take place, but where mixing is to take place as a continuous process, it is generally more appropriate for the grooved surfaces to be coaxial with one another, with rotation between them being about their common axis. The two surfaces may be cylindrical and may be grooved helically.

The mixer and mixing method of the present invention are advantageous in providing for shearing and splitting of the material entered into the gap between the two grooved members. The shearing and splitting that arises from the traversing of the grooves and lands of the two surfaces over one another, separates small elements of the material from one another to enhance the mixing that arises from the distribution of the material in larger bulk within the grooves. It is possible to determine the proportions of shear, split and distributive mixing that occur to achieve the desired mix, by suitable choice of the grooving. For example, by narrowing the grooves the proportion of shear mixing can be increased, whereas the proportion of split mixing can be increased by increasing the number of grooves. The proportion of distributive mixing can be increased by increasing the space within the grooves for turbulence of the material to take place.

Shear mixing is of especial advantage in relation to the achievement of mechanochemical processing by which breakdown of the material at molecular level takes place. Thus, according to another aspect of the present invention there is provided a method of mixing material wherein the material is subjected to shear between relatively moving surfaces to cause mechanochemical reactions within the material breaking down its molecular structure. Mechanochemical processing of this nature has wide application, but is of especial advantage in the reclaim of rubber from used products, notably vehicle tyres and the vulcanised rubber scrap that arises during tyre manufacture. More particularly, the crosslinked chains of the molecular structure of the used rubber can be broken down sufficiently in this way to solubilise it so that it will go into solution with raw rubber or solvents used in rubber production.

BRIEF DESCRIPTION OF THE DRAWINGS

Mixers and methods of mixing in accordance with the present invention will now be described, by way of example, with reference to the accompanying drawings, in which.

DESCRIPTION OF THE PREFERRED EMBODIMENTS

Figure 1:
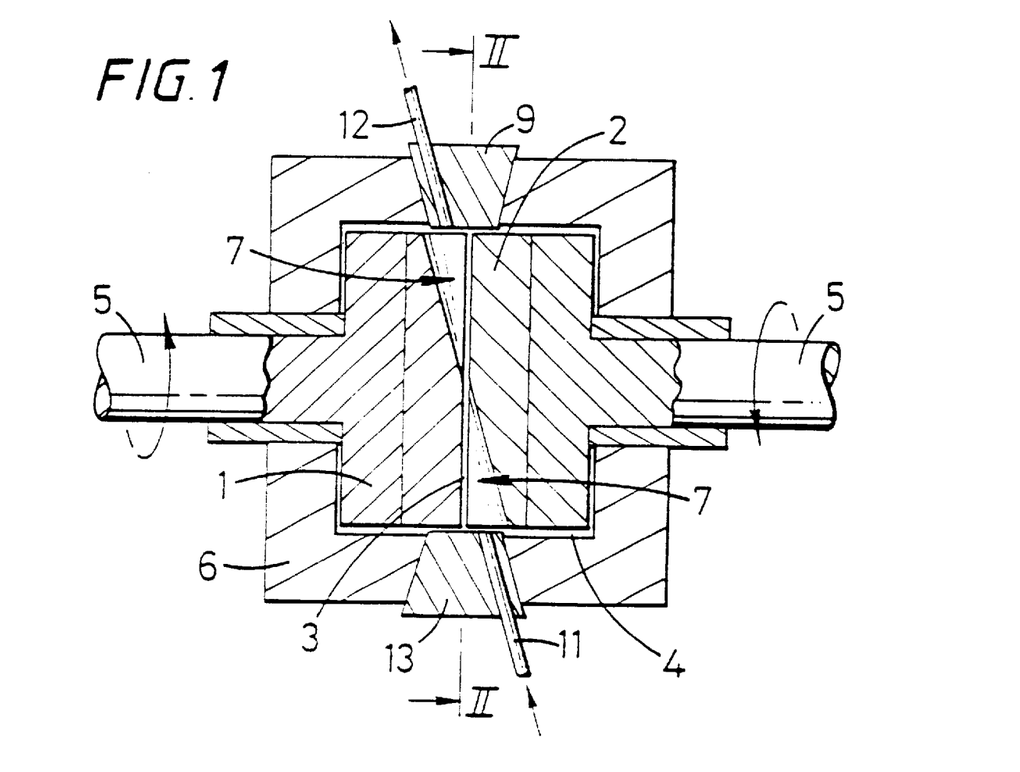
FIG. 1 is a sectional side-elevation of a first batch mixer according to the invention.
Figure 2:
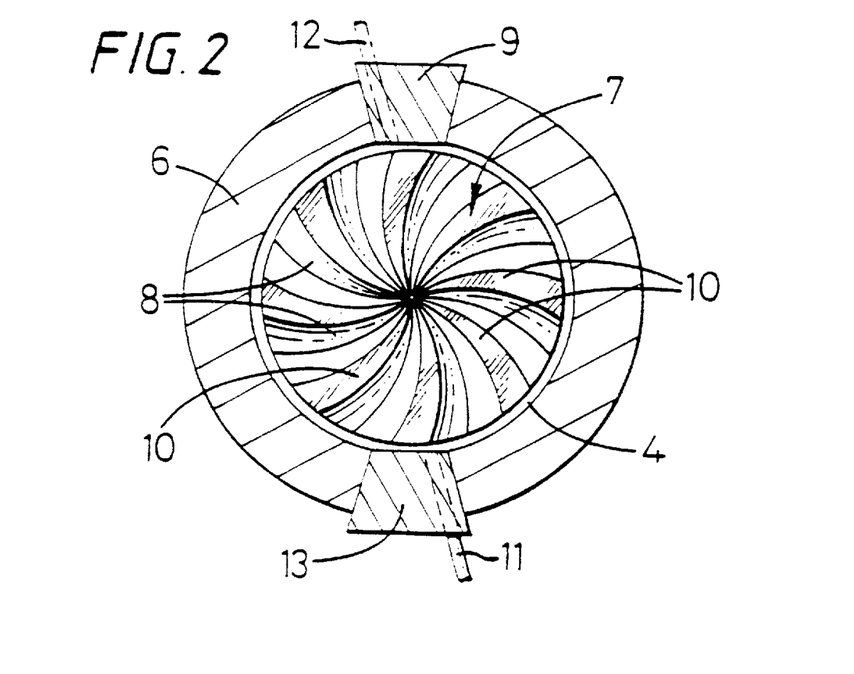
FIG. 2 is a sectional view taken on the line II—II of FIG. 1.

Referring to FIGS. 1 and 2, the batch mixer in this case involves two fluted or grooved rotor-discs 1 and 2 that are mounted face to face with a small gap 3 between them, within a closed chamber 4. The discs 1 and 2 are carried within the chamber 4 by individual flanged-shafts 5 that are horizontally aligned axially. The shafts 5, which are journalled in the wall 6 of the chamber 4, are driven in rotation (through gearing or otherwise) by one or more motors (not shown) to turn in opposite senses to one another.

The discs 1 and 2 have identical scroll faces 7 each of which is made up of a series of spiral grooves 8 (eight grooves in the specific example shown in FIG. 2) that have outwardly-inclined walls. The grooves 8 are of reducing depth as well as width, towards the disc-centre; the groove-depth preferably reduces to zero at the centre. A removable plug 9 is provided in the top of the chamber-wall 6 to enable the material for mixing to be introduced into the chamber 4 and enter the gap 3 between the counter-rotating scroll faces 7. The direction of rotation of each disc 1 and 2 in relation to the sense of the spiral grooving of its scroll face 7 is such that the material entering the gap 3 is urged inwardly along the grooves 8. The space available to this material reduces with decrease in groove-width and -depth towards the centre, so pressure on it increases as it progresses inwardly. The result is that the inwardly-drawn material ultimately wells up away from the disc-centre and from there moves outwardly of the discs 1 and 2 between the material that is being drawn inwardly along the grooves 8 of the two faces 7. Distributive mixing accordingly occurs within the material as it moves and wells-up upon itself under pressure within the gap 3.

Mixing by shear and splitting also take place within the gap 3 between the counter-rotating discs 1 and 2. These further modes of mixing arise more particularly from the cyclic changes of relative position of the opposed scroll faces 7 occurring at each location. The relative positions of the faces 7 at two stages of the cycle are illustrated by FIGS. 3 and 4.

Figure 3:
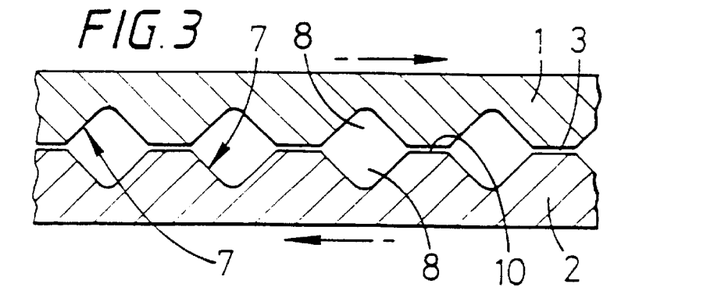
FIGS. 3 and 4 are illustrative to an enlarged scale of the relative positions of two scrolled rotor-discs of the batch mixer of FIGS. 1 and 2 during successive stages of the mixing operation performed thereby.

In the condition illustrated in FIG. 3, the grooves 8 of the two faces 7 are in register with one another, so that the material at this location is at this stage squeezed from between the intervening lands 10 into the spaces afforded by the pairs of opposed grooves 8. As the relative rotation progresses towards the condition illustrated in FIG. 4, for which the grooves 8 of each face 7 are brought into register with the lands 10 of the other, there is a progressive transfer of the material in both directions into the smaller spaces provided by the grooves 8 under the lands 10. The transfer, which is enhanced by the outwardly-inclined walls of the grooves 8, not only results in splitting up of the material to enhance mixing but subjects the material at this location to shear forces. The material leaking up the outwardly-inclined walls of the grooves 8 onto the moving lands 10 is extended or stretched in the shearing process and this extension of the material in shear causes mechanochemical reactions which further the mixing process by rupturing the molecular structure of the constituents of the material.

Figure 4:
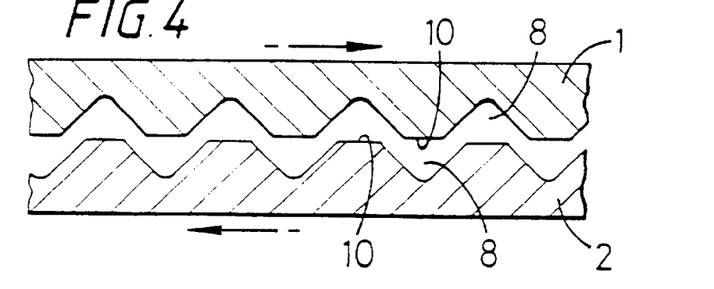

The shear and split mixing continues to take place at each location as the relative rotation of the discs 1 and 2 progresses through the condition illustrated in FIG. 4 to return to that illustrated in FIG. 3. Moreover, as the material at each location is being subjected to this mixing so the same sequence of cyclical change as represented in FIGS. 3 and 4 is occurring, but with different phasing, at adjoining locations spaced radially inwards and outwards from that location. The consequence is that not only is the material subjected to mixing movement across the grooves 8 and lands 10, but also along them. The directions of rotation of the discs 1 and 2 are chosen in relation to the hand of the spiral form of their scroll faces 7 to bring about, as referred to above, a drawing down of the material towards the centre of the discs 1 and 2. Thus, the mixing by shearing and splitting takes place in conjunction with and accompanied by the distributive mixing that occurs by movement of the material down the grooves 8.

The mixing process creates substantial heat and it is in general necessary to provide for the wall 6 and the discs 1 and 2 to be cooled; no such provision is shown in FIGS. 1 and 2 for simplicity. Furthermore, mixing may desirably take place in a controlled atmosphere, and a gas inlet 11 and a gas outlet 12 to the chamber 4 are accordingly provided to facilitate this. As shown in FIG. 1, the gas outlet 12 is conveniently provided in the plug 9, and the inlet 11 is similarly provided in a plug 13 that is removed from the wall 6 when the product of the mixing process is to be drawn off from the bottom of the chamber 4.

The operation of the mixer of FIGS. 1 and 2 has been reproduced in the laboratory using rotor-discs 1 and 2 of some 60 mm in diameter and having eight grooves 8 that decrease in depth linearly from 10 mm at the outer edge to zero at the centre. It has been found that when the gap 3 between the discs 1 and 2 (for example, of between 0.2 mm and 5 mm) is filled to the optimum of about 50%, a motor drive of about 1 horsepower (745.7 W) at fifty revolutions per minute is adequate for successful execution of the mixing process on a rubber material of about 3,000 poise ($300 \text{ N/m}^2$).

Figure 5:
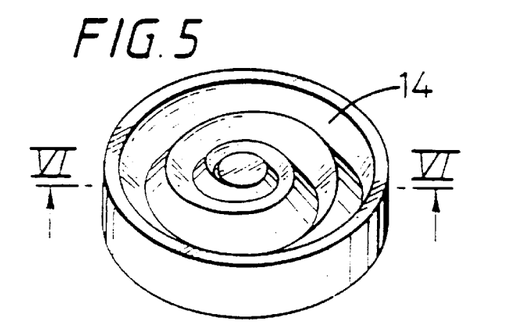
FIGS. 5 and 6 illustrate respectively in perspective and section taken on the line VI—VI of FIG. 5, a form of single-spiral scrolling that may be used for the disc-rotors of the batch mixer of FIGS. 1 and 2.
Figure 6:
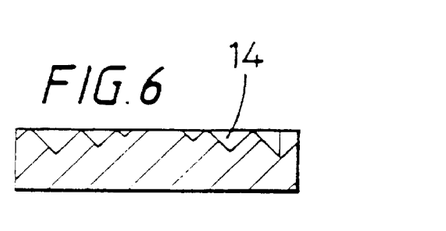

The scroll faces 7 of the discs 1 and 2 of the mixer of FIGS. 1 and 2 are each made up of a multiplicity of spiral grooves 8 of short angular extent. However, a single spiral groove of one or more turns may be used instead; the form of a rotor-disc that is grooved with a single, plural-turn spiral groove 14 is illustrated in FIGS. 5 and 6. Where a plural-turn spiral groove such as the groove 14 is used, the force urging material to the centre is less than where a short-sector pattern of multi-start grooving; like that illustrated in FIG. 2, is used. The groove-walls, which are generally outwardly-inclined, are preferably straight in section so as to allow easy flow of material in and out, and the bottom of each groove is preferably rounded for the same purpose. Split mixing may be enhanced by increasing the inclination angle of the groove-walls so that the grooving tends to a U-shape in section, whereas distributive mixing may be enhanced by using less rounded bottoms to the grooves.

Figure 7:
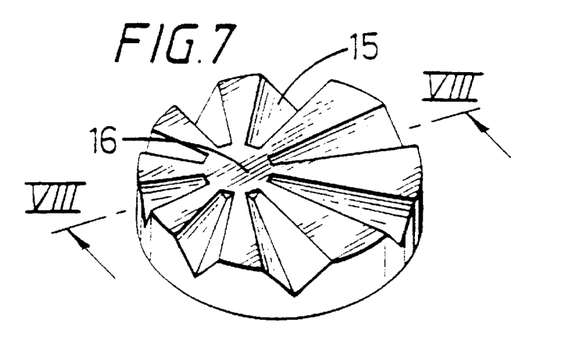
FIGS. 7 and 8 illustrate respectively in perspective and section taken on the line VIII—VIII of FIG. 7, a form of straight-groove scrolling that may be used for the disc-rotors of the batch mixer of FIGS. 1 and 2.
Figure 8:
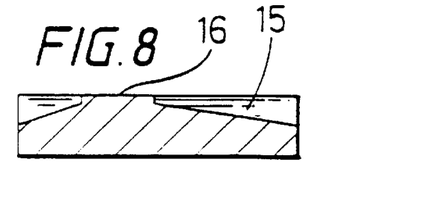

The grooving need not be of spiral form, but may be straight. A rotor-disc having straight grooving is illustrated in FIGS. 7 and 8, the disc in this case having eight straight grooves 15 with outwardly-inclined walls, that radiate from, and decrease progressively in depth towards, an off-centre circular land 16; the asymmetry can be used with appropriate direction of rotation to urge inward movement similar to that achieved with spiral grooves. The use of discs having straight grooving in this way, has advantage in that they are generally less costly to manufacture, and it is more-readily possible to provide replaceable tips to the groove-edges.

Figure 9:
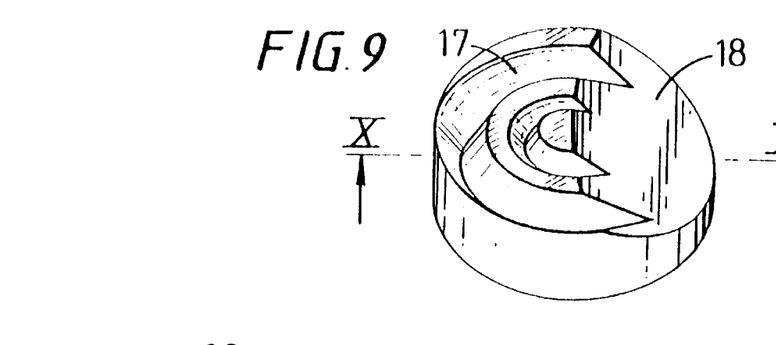
FIGS. 9 and 10 illustrate respectively in perspective and section taken on the line X—X of FIG. 9, a further of scrolling that may be used for the disc-rotors of the batch mixer of FIGS. 1 and 2.
Figure 10:
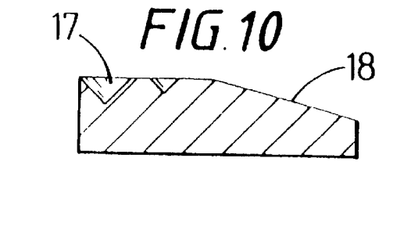

A further possible form of rotor disc is illustrated in FIGS. 9 and 10. The form in this case is based on a plural-turn spiral groove 17 with outwardly-inclined walls comparable with that of the rotor illustrated in FIGS. 5 and 6, but has an inclined flat 18 milled into the spiral pattern to leave only two half-turns of the grooving. Distributive mixing is enhanced using rotors of this form.

Although both grooved faces 7 rotate in vertical planes in the mixer of FIGS. 1 and 2, it is not necessary for there to be rotation of both, or for any special orientation of them. A form of batch mixer (suitable, for example, for recycling waste in a rubber factory) in which just one of grooved faces rotates, and the rotation is in a horizontal plane, is illustrated in FIG. 11 and will now be described.

Figure 11:
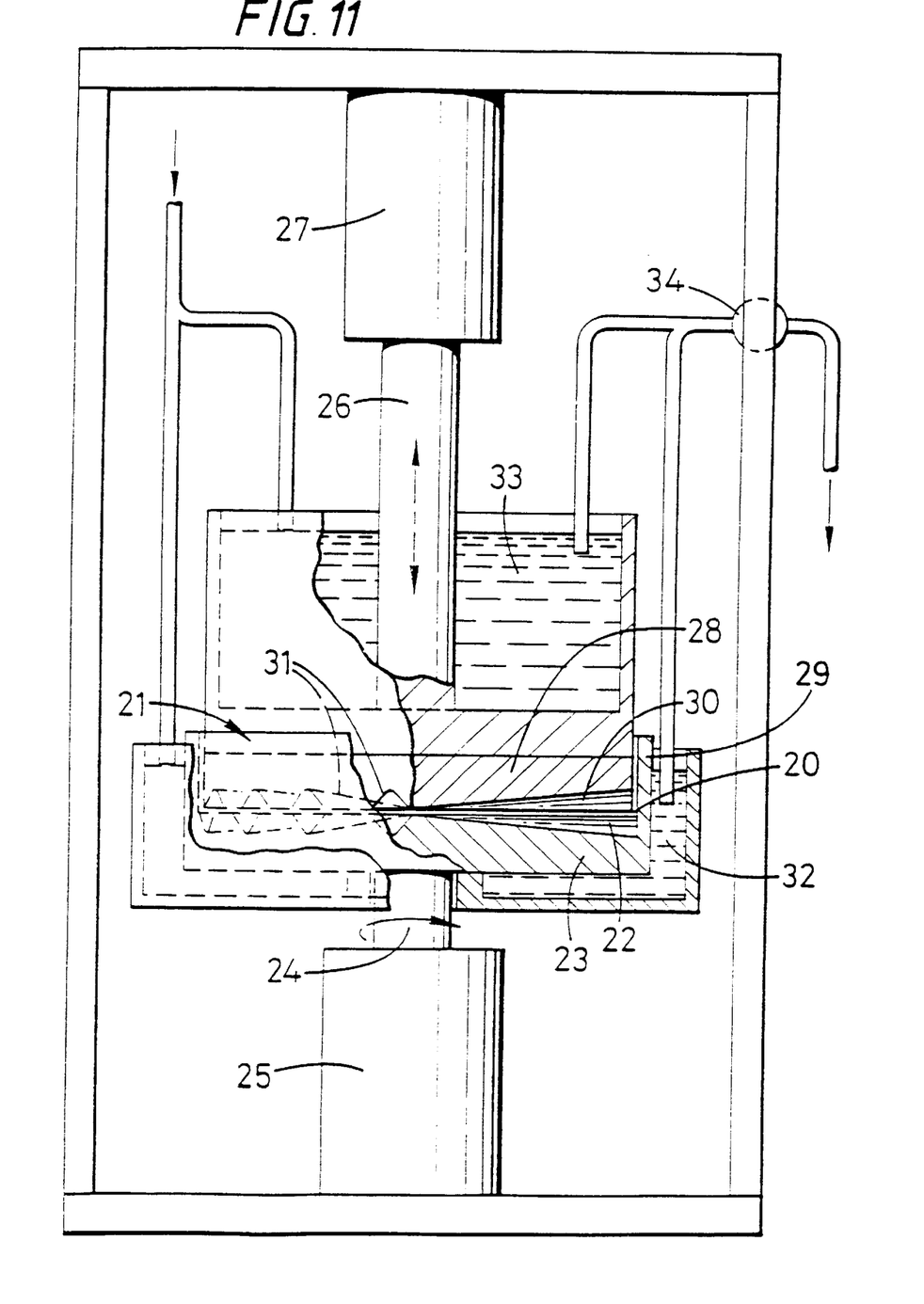
FIG. 11 is a part-sectional side elevation of a second form of batch mixer according to the present invention.

Referring to FIG. 11, the mixing chamber 20 in this case is within a cup-shaped member 21 that has spiral-grooving 22 corresponding to that of the discs 1 and 2 internally of its base 23 (as with the discs 1 and 2, the modified forms of grooving described with reference to FIGS. 5 to 10 may be used instead). The member 21 is mounted on the vertical shaft 24 of a motor 25 for rotation in a horizontal plane relative to the piston-rod 26 of a fixed hydraulic-ram 27. The rod 26 is axially aligned with the shaft 24 and carries a grooved disc 28 that is entered within the cylindrical side-wall 29 of the member 21. The disc 28 is held against rotation and is located on the rod 26 with its grooving 30 (with outwardly-inclined groove-walls) facing the grooving 22 at a small distance from the base 23 of the member 21 within the chamber 20.

Rotation of the member 21 relative to disc 28 under controlled drive from the motor 25 creates conditions for good distributive, split and shear mixing within the chamber 20 between the opposed groovings 22 and 30. The edge of the disc 28 has grooves or flutes 31 that are inclined in relation to the direction of rotation of the member 21 such that any material which during mixing tends to escape from the chamber 20 up the side-walls 29, is urged back into the space between the groovings 22 and 30. The inside of the side-wall 29 may also be fluted to the same end.

The disc 28 can be withdrawn from the member 21 so as to allow access for loading and emptying the mixing chamber 20, and can be returned to establish the desired small spacing between the groovings 22 and 30, by simple operation of the ram 27. A water-jacket 32 is provided for cooling the member 21, and a water-chamber 33 for cooling the disc 28. Water is circulated through the jacket 31 and chamber 32 under control of a pump 34.

Batch mixers of the nature described above are appropriate for relatively short runs of mixing, for example in the production of compounds for general rubber goods and minor tyre manufacture. But the present invention is applicable to continuous mixing as well as to batch mixing, and a form of continuous mixer in this respect, is illustrated in FIG. 12 and will now be described.

Figure 12:
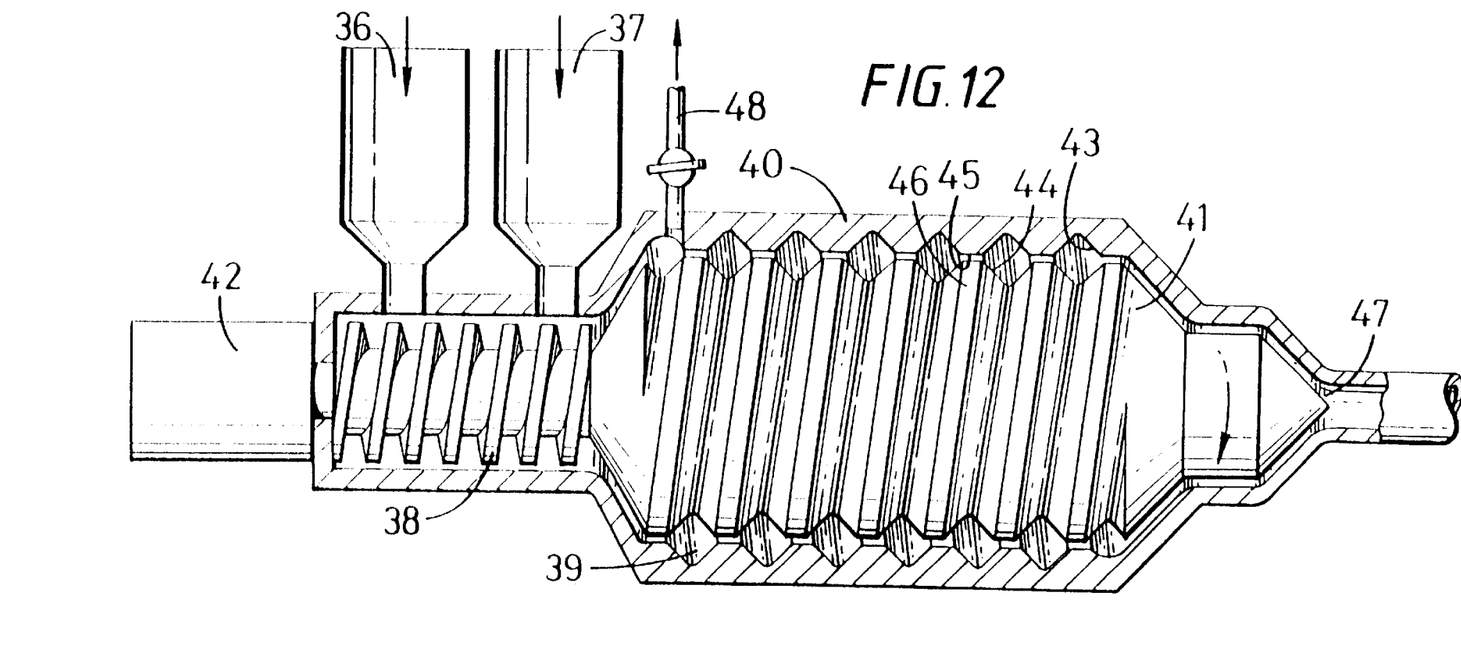
FIGS. 12 and 13 are sectional side-elevations of two forms of continuous mixer in accordance with the invention.

Referring to FIG. 12, materials to be mixed together are supplied from hoppers 36 and 37 to a screw 38 for passage together into a mixing chamber 39 within a barrel 40 that is helically grooved internally. A cylindrical rotor 41 that is helically grooved and mounted coaxially within the barrel 40, is driven in rotation with the screw 38 by a motor 42.

The helical grooving 43 and 44 of the barrel 40 and rotor 41 are of opposite hand to one another and have outwardly-inclined groove-walls so that with the relative rotation between them, cyclic changes comparable with those illustrated and described above with reference to FIGS. 3 and 4 take place lengthwise of the rotor 41 to give rise to shear and split mixing within the chamber 39 under and between the lands 45 of the grooving 43 and the lands 46 of the grooving 44. Distributive mixing also takes place as material moves under pressure along the grooving 44 opposed by material tending to move in the opposite direction along the grooving 43. The mixed product progressing along the rotor 41 exits under pressure from the chamber 39 (for example, as a continuous strip) via a die 47.

The barrel 40 has a port 48 for allowing air and other gasses to be vented from the chamber 39 when it is desired to carry out the mixing process in a nominal vacuum. Facilities (not shown) for cooling the barrel 40 and rotor 41 are also provided.

Figure 13:
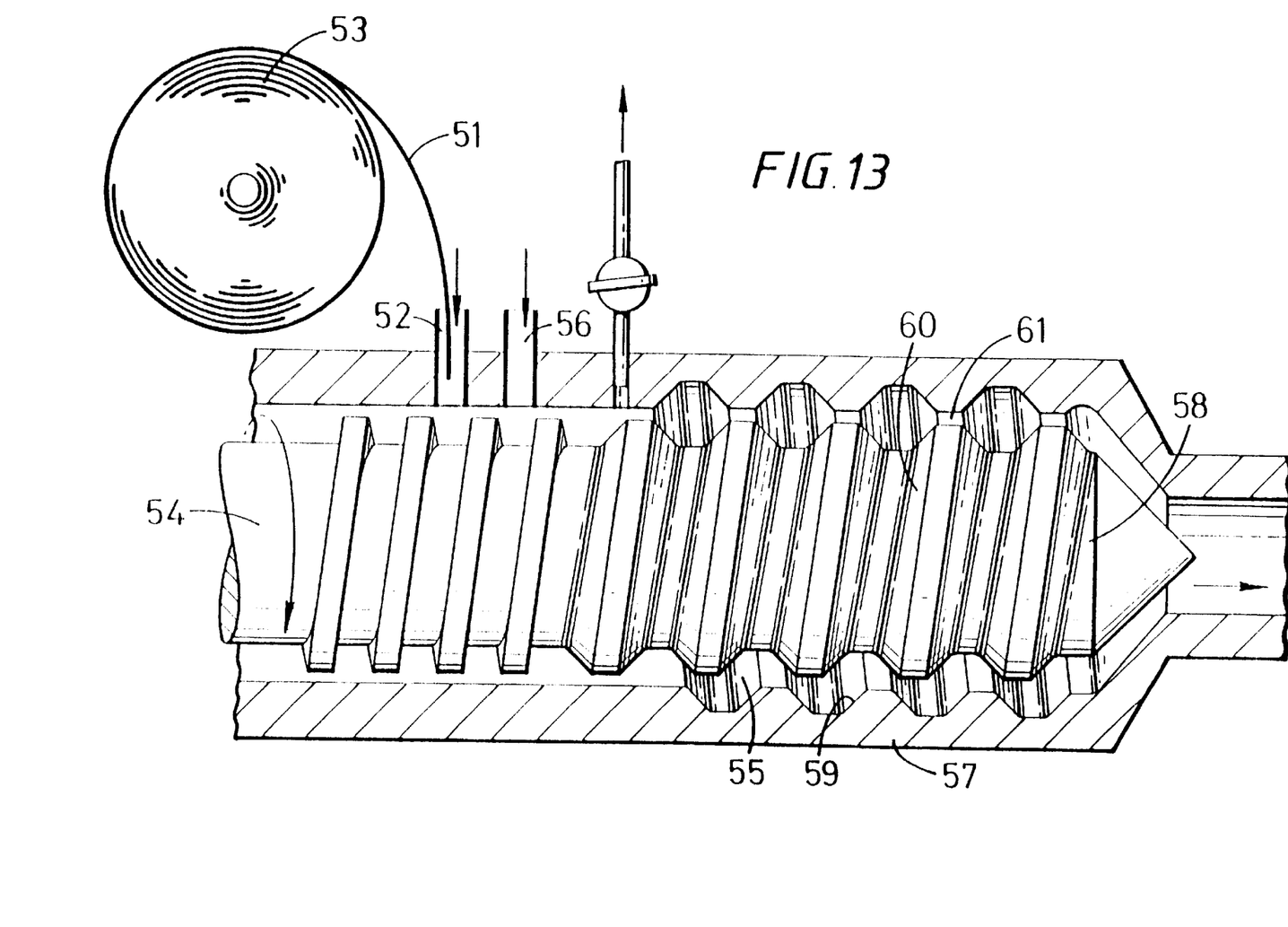

A mixer similar to that of FIG. 12, used for continuous mastication with mixing of rubber-product supplied in strip form, is illustrated in FIG. 13, and will now be described.

Referring to FIG. 13, strip 51 of masticated rubber or rubber-compound is fed continuously into an inlet port 52 of the mixer from a reel 53 to be chopped into pieces by a screw 54. The pieces of strip 51 are fed by the screw 54 into a mixing chamber 55 together with pieces of vulcanised rubber that are supplied to the screw 54 via an inlet port 56. The strip- and vulcanised-pieces are broken down under shear between a stationary barrel 57 and a rotating rotor 58 of the mixer. The barrel 57 has helical grooving 59 of opposite hand to, and larger pitch than, the helical grooving 60 of the rotor 58; the walls of the grooving 59 and 60 are outwardly inclined to enhance the extensional-shear mixing effect.

The forms of groovings 59 and 60 used and the size of minimum gap 61 (land to land) between them, determine the characteristics of the mixer in regard to the materials to be mixed. A choice of the proportions of the different modes of mixing effective in the mixing action, needs to be made. For example, it is important to have extensional-shear mixing for masticating rubbers and incorporating aggregated carbon black into them. This is achieved in the context of the outwardly-inclined groove-walls by having narrow gaps between the relatively-rotating surfaces and 25% or more of their surfaces in the form of lands. On the other hand, a machine with high distributive and split-action mixing is useful for uniform mixing of easily-separated non-reinforcing filler particles such as chalk or clay into polyethylene or plasticiser into polyvinyl chloride, or of the chemicals causing vulcanisation in rubbers.

When it is wished to comminute a fibre while mixing it into a polymer, a high proportion of shear and split-action mixing is desirable. On the other hand, when it is desired to mix easily-separated materials with minimum energy, a high proportion of distributive and split-action mixing is advantageous.

An important application of heavy-duty mixers is in the mixing of raw rubber with compounding ingredients. Some fifteen million tons of rubber are so treated annually. However, the current range of mixers have obvious deficiencies in that they do not have consistent mixing action and tend to overheat in spite of the provision of water cooling. The rise in temperature, for example by up to 150 degrees Celsius, can affect the material being mixed to the extent that the mixed product may vary significantly in its properties from one batch to another when a batch mixer is involved, and from one part to another of the output of a continuous mixer. Mixers according to the invention have been found to have a more consistent mixing action and related temperature characteristic so that the quality of the mixed product is less subject to variation and is more readily reproducible.

A train of two or more mixers with different mixing characteristics and operating under different mechanical and temperature conditions enables optimum mixing to be achieved during different phases of the overall process. For example, in the compounding of rubbers, a first mixer may provide a high proportion of extensional-shear mixing to masticate the rubber and disperse the filler. The second machine may then have a high proportion of distributive mixing and operate at lower temperatures to avoid the danger of "scorch" for vulcanisation chemicals, so as to enable finer control of viscosity and elasticity of the final compounded stock to be achieved.

Blending of rubbers is also a frequent operation in making compounded stock. However, polymers are inherently insoluble in each other and form domains of each rubber with different amounts of filler and vulcanising chemicals in each type of domain. Mixers according to the invention have been found to give more intimate mixes of smaller domains. Also, by mixing in the absence of oxygen and other radical acceptors, the rubber radicals can combine with each other to form block polymers. The block polymers act as solubilising agents for the individual rubbers and so as to result in a more intimate mix.

Incomplete mixing manifested as "fish eyes" often occurs on mixing polyvinyl chloride powder with plasticisers. This is obviated by using a mixer according to the invention with a high proportion of shear mixing; the resultant compound is particularly valuable for subsequent extrusions of clear tubing. The provision of a high proportion of shear mixing is also of advantage in the mixing of polyethylene with carbon-black fillers in that it avoids the otherwise often-experienced incomplete mixing which gives rise to non-uniform distribution (on a microscopic scale) of the filler and diminution of physical properties of the final product.

The mixers according to the invention can also be used to treat combinations of materials not treatable satisfactorily by conventional mixers. For example, they may be applied to mixing a high proportion of straw with polyethylene; mixes containing 75% straw, suitable for use as a moulding compound and having a density approaching unity, have been achieved. Also, they may be used for mixing rubber chips with polystyrene in a blend that is sufficiently intimate to enable a toughened polystyrene comparable with that achieved by adding latex, to be realised.

However, a significant application of the mixing technique of the present invention is in the context of mechanochemical reclaim of rubber by which a soluble material having good rubber properties is reclaimed from used rubber products by breaking down the network of crosslinked chains using mechanical forces imposed on the rubber at molecular level. When the crosslinks and chains in the network are reduced below the Flory gel point, the product becomes soluble in solvents for the rubber, including, for example, asphalt and bitumen.

A major application for this method is in the reclaim for re-use of rubber from used vehicle tyres. It may be used also for recycling the vulcanised rubber scrap produced in manufacture of tyres and other rubber products.

A soluble reclaim cannot be made by conventional mills or mixers. These can break up a tyre and the metal and textile can be removed by magnets and sieves. However, the rubber is left in a crumb or chip form with substantially all its crosslinks preserved. The crumb or chip, which is insoluble in the solvents for rubber, is accordingly insoluble in the rubber of any fresh formulation and its particulate form is preserved through to the second vulcanisate.

In accordance with the method of the present invention, the rubber for reclaim is supplied to a mixer of, for example, the general form described above with reference to FIG. 13. In the latter respect, the rubber, which may be supplied in chip form to the inlet port 56 is mixed with a minor proportion of raw rubber or other material over 3,000 poise (300 $N/m^2$) added via the inlet port 52. The repetitive shearing of the added, matrix material between the grooved rotor 58 and barrel 57 within the mixing chamber 55, is accompanied by shear of the rubber chips. The shearing eventually results in a mechanochemical break-down of the chains and/or crosslinks of the rubber material of the chips to below the Flory gel point, so that it becomes soluble and goes into solution with the raw rubber or other added, matrix material.

In order to solubilise the chips, it is desirable for the minimum gap 61 between the rotor 58 and barrel 57 to be less than 0.5 mm so that the shear forces are imposed directly, comminuting the chip material over 10-mesh.

The tread of bus, truck, off-the-road and aircraft tyres usually involves unblended natural rubber, and there is advantage in utilising just this part of the tyre for mechanochemical treatment. The tread rubber can be cut for processing as strips from the cap and/or undertread of the tyre circumference, or may be in the form of buffings, chips or crumbs from these two parts of the tyre. The rubber involved has good physical properties which are to a large extent preserved in the mechanochemical reclaim. This reclaimed material when incorporated to some 20% in a new rubber formulation, has been found to result in a material having a tensile strength in excess of some 75% of what would otherwise have been realised.

It may be advantageous also to reclaim just the rubber in the lower part of the tyre called the apex. This is enclosed in a textile ply that is covered by rubber on the outside, and whereas it is feasible to remove this ply by cutting prior to treatment, the whole, including the ply, may be treated. In the latter case, the ply is broken up during the mechanochemical reclaim so that the resultant mix is a fibre-reinforced rubber product that has application, for example in the damp course of a building, where load-bearing and resistance to creep are desired.

The mixing method may also be carried out on the radial and cross-ply parts of the tyre with or without adjoining tread. This is especially so if the plies are of textile. Nevertheless, it can also be carried out with metal plies if the grooved rotor and barrel of the continuous mixer (or the grooved rotor discs where a batch mixer is used) are of a suitable alloy so as not to be damaged by the metal fibers. Moreover, the whole tyre after being stripped of the bead wire can be recycled, the flattened tyre being, for example, chopped into generally rectangular strips having a width of about 50 mm for feeding into the mixer for mechanochemical processing. The result is a solubilised rubber containing all the polymeric and non-polymeric constituents of the tyre with randomly oriented fibers from the broken tyre plies. If required, the fibers can be oriented by extrusion or calendering.

If the mixing is carried out in air, oxygen or ozonized air, the treated material is relatively soft and tacky, i.e. self-adhering, which may be advantageous in certain applications where adhesion of parts is required during product manufacture; it is the oxygen content that determines the degree of tackiness. If air, or more particularly, oxygen, is excluded from the mixing chamber by use of a nitrogen, argon, carbon dioxide or other inert-gas atmosphere in the mixing chamber, or is removed by evacuation, the treated material is relatively stiff and has a generally non-tacky surface; enhanced physical properties such as strength and modulus of elasticity, of virgin-rubber formulations can be achieved using the reclaimed material as an ingredient.

The mixing process can be readily controlled to give the optimum output product. In particular, the properties of the output product may be affected by the speed of relative rotation of the grooved parts within the mixing chamber. It has been found, for example, that when operating with an air atmosphere in the mixing chamber, the problem of the rubber material becoming so oxidised that it sticks to the grooved parts, can be avoided while still producing a satisfactorily solubilised product, simply by reducing the speed of relative rotation. The degree of shearing involved to produce solubility may also affect the physical properties of the resultant solubilised rubber.

The mixing carried out according to the present invention is mechanically and not chemically induced. Hence the different chemical reactivities of rubbers, for example non-polarity of butyl rubber compared with the polarity of nitrile rubber, is not of major consequence. What is of consequence is the strength of the crosslink or main-chain bond and the amount of shear which can be imposed on it to cause it to rupture. As most vulcanisates have sulphur-sulphur bonds in the crosslinks and these are weaker than main-chain bonds, it is explicable that all sulphur vulcanisates breakdown to become soluble at rates of the same order. The rates of breakdown correlate more with the bulk viscosities of the rubbers than with any chemical property and within a rubber type, for example a vulcanisate made from crepe rubber breaks down faster than one from SMR20 natural rubber grade.

However, the method of the invention is not only applicable to sulphur-sulphur crosslinked vulcanisates. Carbon-bond crosslinks of peroxide-cured rubbers (for example butyl rubber of inner tubes of tyres) and polyisocyanate crosslinks of polyurethanes also undergo breakdown by the treatment according to the invention to produce ultimately soluble materials.

Bitumens and asphalts can be used with the vulcanised rubber as matrices for shearing instead of, or together with, raw rubber. Non-polar rubbers such as styrene-butadiene and natural rubber are soluble in bitumens and asphalts and confer increased viscosity at ambient temperature and during abnormally hot weather. They also increase the adhesion of the bitumen or asphalt to aggregate and other solid constituents of road-marking composites, and increase the flexibility against cracking or composites in applications such as on bridge roadworks.

I claim:

1. A mixer for mixing material entering into the mixer, said mixer comprising:
   first and second members each having a grooved surface, the grooved surface of each of the first and second members comprising of plurality of lands spaced from one another to define elongate grooving between the lands, the elongate grooving having walls that are inclined both with respect to the grooved surface and upwardly and outwardly with respect to one another from a base of the grooving;
   mounting means for mounting the first and second members on a common axis with their grooved surfaces in an opposed relationship to one another, the mounting means providing the first and second members with a gap spacing between the grooved surfaces; and
   means for rotating the first and second members relative to one another about said axis to traverse the lands of each grooved surface with the lands of the other grooved surface across the gap, for shearing and splitting within the gap said material entered in the mixer; wherein the grooving of each member is curved along a radial length of the grooving for drawing said material along the grooving to well up for distributive mixing in the gap.

2. A mixer according to claim 1, wherein said grooved surfaces are substantially-planar grooved faces of the first and second members, and the first member is mounted for rotation relative to the second member about said axis with its grooved face opposed across the gap to the grooved face of the second member.

3. A mixer according to claim 2, wherein the grooving of at least one of said members comprises at least part of a spiral groove.

4. A mixer according to claim 3, wherein the grooving of at least one of said members comprises a multiplicity of spiral grooves each of less than one turn.

5. A mixer according to claim 3, where the grooving of at least one of said members comprises grooves that are of a reduced width and depth inwardly of the respective member towards said axis.

6. A mixer according to claim 2, wherein the two members are disc members and said mounting means includes two shafts aligned axially with said axis, and said discs are mounted respectively on the axially-aligned shafts.

7. The mixer according to claim 2, wherein the second members is mounted for rotation relative to the first member.

8. A mixer according to claim 2, wherein one of the members is a cup-shaped member and the other is a disc member, and said mounting means includes means for mounting the disc member entered within the cup-shaped member.

9. A mixer according to claim 1, wherein each of the grooved surfaces is a cylindrical surface coaxial with said common axis, and the first member is mounted for rotation relative to the second member about said common axis.

10. The mixer according to claim 9, wherein one of the grooved surfaces is an internal cylindrical surface of the second member, and the other is an external cylindrical surface of the first member, the first member being mounted within the second member for rotation relative thereto.

11. The mixer according to claim 9, wherein the grooving of the two surfaces is helical grooving.

12. A mixer according to claim 11, wherein the helical grooving of the two members are of opposite hand to one another.

13. The mixer according to claim 11 wherein the helical grooving of the first and second members are of different pitch from one another.

14. A method of mixing comprising the steps of:
   providing first and second members each having a grooved surface, the grooved surface of each member comprising of plurality of lands spaced from one another to define elongate grooving between the lands, the grooving of each member being curved along a length of the groove, the grooving having walls that are inclined with respect to the grooved surface and upwardly and outwardly with respect to one another from a base of the grooving;
   mounting the first and second members on a common axis with their grooved surfaces opposed to one another, the first and second members being mounted with a gap between the grooved surfaces; rotating the first and second members relative to one another about said axis to traverse the lands of each grooved surface with the lands of the other grooved surface across the gap; and entering material to be mixed into the gap between the first and second members; the sense of the relative rotation of the first and second members being chosen in relation to the curving of the grooving to draw the entered material into the gap along the grooving for welling up from the grooving into the gap for distributive mixing accompanied by shearing and splitting of said material in the gap.

15. A method according to claim 14, further comprising the steps of:

fabricating said grooved surfaces into substantially-planar grooved faces of the first and second members, and mounting the first member for rotation relative to the second member about said axis with said grooved face of the first member opposed across the gap to the grooved face of the second member.

16. A method according to claim 15, further comprising the steps of:

forming the grooving of at least one of said members with at least part of a spiral groove, and rotating the two faces in a direction which in relation to the sense of the spiral grooving urges said material down the grooving towards the axis of such rotation.

17. The method according to claim 14, wherein the grooved surfaces are helically-grooved coaxial surfaces one of which rotates relative to the other about their common axis.

18. A method according to claim 17, further comprising the steps of:

aligning the helical grooving of each member in an opposite orientation one another.

19. The method according to claim 14, wherein the shearing causes mechanochemical reactions within the material breaking down its molecular structure.

20. The method according to claim 14 used for rubber reclaim, wherein the shear to which the rubber for reclaim is subjected breaks down its molecular structure sufficiently to solubilize it.

21. A method according to claims 14, further comprising the steps of:

performing the method in an atmosphere containing oxygen.

22. A method according to claim 14, further comprising the steps of:

performing the method in an inert-gas atmosphere.

23. The method according to claim 14 wherein the helical grooving of the first and second members are of different pitch from one another.

* * * * *